W. R. GREEN.
ATTACHING MEANS FOR MUD GUARDS.
APPLICATION FILED JULY 8, 1915.
1,176,750.  Patented Mar. 28, 1916.
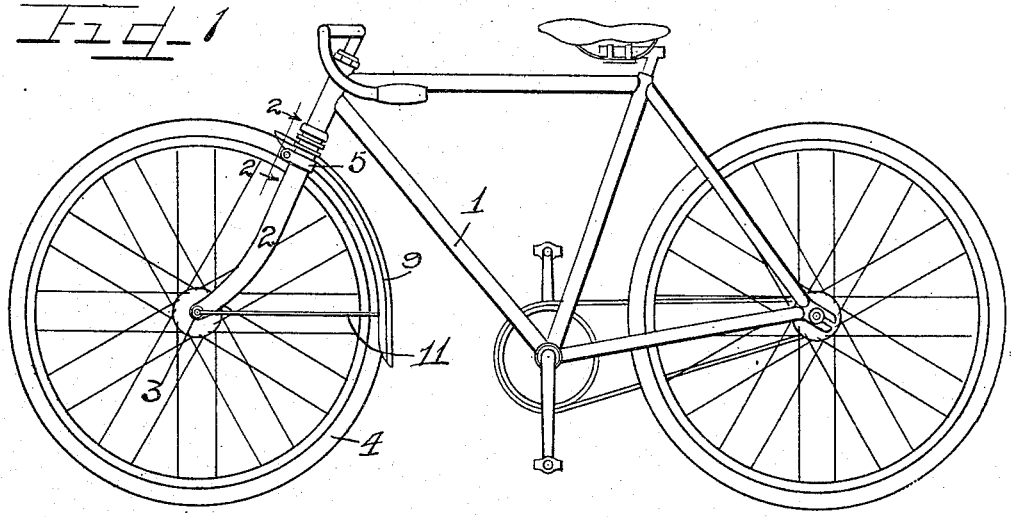
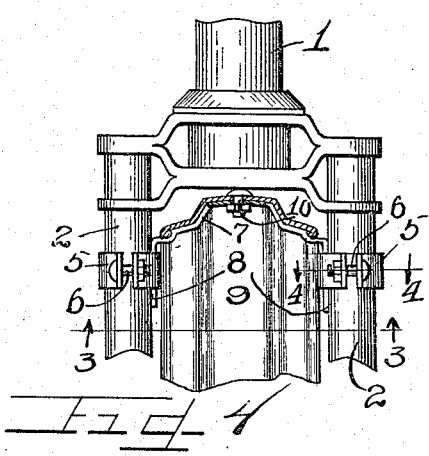
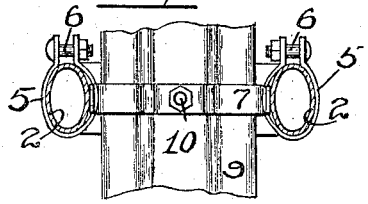
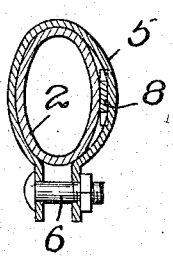
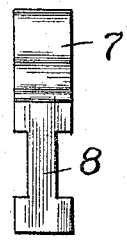
Witnesses
J. W. Angell
Charles W. Ills Jr.
Inventor
Walter R. Green
by Charles W. Ills
Atty.

UNITED STATES PATENT OFFICE.

WALTER R. GREEN, OF CHICAGO, ILLINOIS.

ATTACHING MEANS FOR MUD-GUARDS.

1,176,750.  Specification of Letters Patent.  Patented Mar. 28, 1916.

Application filed July 8, 1915. Serial No. 38,658.

*To all whom it may concern:*

Be it known that I, WALTER R. GREEN, a citizen of the United States, and a resident of the city of Chicago, in the county of Cook and State of Illinois, have invented certain new and useful Improvements in Attaching Means for Mud-Guards; and I do hereby declare that the following is a full, clear, and exact description of the same, reference being had to the accompanying drawings, and to the numerals of reference marked thereon, which form a part of this specification.

This invention relates to a device for use in attaching mudguards in place upon a vehicle, particularly over the front wheel of a bicycle, permitting ready adaptation of the guard to the bicycle without necessitating changes in the bicycle structure and capable of easy attachment without the use of special tools for the purpose.

It is an object therefore of this invention to construct an attaching means for mudguards, permitting ready adaptation thereof to a vehicle.

It is also an object of this invention to construct attaching means for connection of a mudguard to the fork of a bicycle, said means adjustable for attachment at different points on the fork and adapted to support a bracket to which the guard is rigidly but detachably connected.

It is furthermore an important object of this invention to construct a bracket for use with clamps in attaching the bracket upon the fork of a bicycle with means for rigidly connecting a mudguard to said bracket and to the axle bolt of the bicycle wheel to support the mudguard rigidly over the periphery of the wheel.

It is finally an object of this invention to construct a device easy and cheap to manufacture and capable of being attached in place by an inexperienced person.

The invention (in a preferred form) is illustrated in the drawings and hereinafter more fully described.

In the drawings: Figure 1 is a side elevation of a bicycle equipped with a device embodying the principles of my invention. Fig. 2 is a detail section taken on line 2—2 of Fig. 1, with the wheel omitted. Fig. 3 is a detail section taken on line 3—3 of Fig. 2. Fig. 4 is an enlarged detail section taken on line 4—4 of Fig. 2. Fig. 5 is a side elevation of the bracket with the clamp and mudguard omitted.

As shown in the drawings: The reference numeral 1, indicates as a whole a bicycle, the front fork of which is denoted by the reference numeral 2, and journaled on an axle bolt 3, provided in the lower end of the fork is a front wheel 4. Engaged upon each of the fork members 2, are straps or clamps 5, capable of being tightened upon the fork members by adjusting nuts and bolts 6. Adapted to be rigidly held in position upon the fork 2, by means of said respective clamps 5, is a bracket 7, the ends of which are bent down in parallel relation and are notched on each edge, leaving a central narrow shank portion 8, around which the clamping members 5, engage, to prevent movement of the bracket in the clamping members. The mudguard is denoted by the reference numeral 9, and in section is of the double channel form shown in Fig. 2, and in side elevation is curved substantially to conform to the curvature of the wheel 4, though at its lower end, as shown in Fig. 1, straightens downwardly. As clearly shown in Fig. 2, said bracket 7, is shaped to fit closely within the inner surface of the mudguard 9, and is positively connected thereto by a small bolt 10, provided with a nut for the purpose. Brace rods 11, are provided which are secured to the lower end of the mudguard 9, in any suitable manner, and also attached upon the axle bolt 3, beneath the usual axle nuts provided thereon to stiffen the guard and maintain the same in proper position at all times.

The operation is thought to be obvious from the description. However, it is evident that the guard may be as readily attached to the rear fork of the bicycle as to the front, and the length of the mudguard is immaterial, as obviously the same may be readily lengthened to an extent greater than that shown in Fig. 1, to shield a greater portion of the periphery of the wheel if so desired.

I am aware that various details of construction may be varied through a wide range without departing from the principles of this invention, and I therefore do not propose limiting the patent granted otherwise than necessitated by the prior art.

I claim as my invention:

1. In a device of the class described, the combination with a bicycle, and a mud guard therefor, of a bracket interfitting said mud guard and positively connected thereto, and clamping members adapted to be secured on the bicycle and to receive the ends of said bracket to clamp the same rigidly upon the bicycle.

2. In a device of the class described, the combination with a bicycle, and a mud guard therefor, of a bracket interfitting the mud guard, and clamping members each independently attachable upon the fork members of the bicycle and adapted to receive and clamp the ends of said bracket between the same and said fork members to hold said bracket rigidly attached to the bicycle.

3. In a device of the class described, the combination with the fork of a bicycle frame, and a wheel journaled therein, of clamps mounted on said fork, a bracket having recessed ends engaged by said clamps, and a mud guard positively connected to the bracket and surrounding a portion of the wheel.

In testimony whereof I have hereunto subscribed my name in the presence of two subscribing witnesses.

WALTER R. GREEN.

Witnesses:
CHARLES W. HILLS, Jr.,
EARL M. HARDINE.

Copies of this patent may be obtained for five cents each, by addressing the "Commissioner of Patents, Washington, D. C."